United States Patent [19]

Steiger et al.

[11] 4,108,670
[45] Aug. 22, 1978

[54] POROUS REFRACTORY METAL BORIDE ARTICLE HAVING DENSE MATRIX

[75] Inventors: Roger A. Steiger, Canal Fulton, Ohio; Frederick G. Stroke, McMurray, Pa.

[73] Assignee: PPG Industries, Inc., Pittsburgh, Pa.

[21] Appl. No.: 752,031

[22] Filed: Dec. 20, 1976

[51] Int. Cl.$^2$ .............................................. G01B 35/04
[52] U.S. Cl. ................... 106/40 R; 106/41; 106/73.3; 423/297
[58] Field of Search ............... 106/40 R, 41, 55, 57, 106/73.3; 423/297; 264/59, 63

[56] References Cited

U.S. PATENT DOCUMENTS

| | | | |
|---|---|---|---|
| 2,360,929 | 10/1944 | Blaha | 106/41 |
| 3,051,566 | 8/1962 | Schwartz | 264/63 X |
| 3,215,545 | 11/1965 | Reidl et al. | 106/55 |
| 3,362,818 | 1/1968 | Schwarzkopf et al. | 264/59 X |
| 3,979,500 | 9/1976 | Sheppard | 423/297 X |

FOREIGN PATENT DOCUMENTS

| | | | |
|---|---|---|---|
| 665,291 | 6/1963 | Canada. | |
| 2,523,423 | 5/1976 | Fed. Rep. of Germany | 423/297 |

OTHER PUBLICATIONS

Tyrrell, M. E. et al., "Bureau of Mines Report of Investigations", U.S. Dept. of Interior, 1964.

Primary Examiner—G. O. Peters
Attorney, Agent, or Firm—Irwin M. Stein; William M. Dooley

[57] ABSTRACT

Refractory metal diboride articles having an overall density of 50–90 percent of theoretical and a matrix of near theoretical density, e.g., 95–99 percent are described. They may be made by cold pressing and sintering an intimate mixture of submicron Group IVb metal diboride powder and finely divided solid hydrocarbon, e.g., microcrystalline petroleum wax. The hydrocarbon remains particulate in the cold pressed piece but is driven out by heat at the beginning of the sintering operation, thereby leaving voids which remain as gross pores surrounded by a dense matrix in the sintered article. Submicron boride powders capable of forming the dense matrix contain a minor proportion of a sintering or densifying aid such as carbon or a metal carbide such as titanium carbide, tungsten carbide, or boron carbide. The articles so produced are lighter in weight than non-porous articles of the same size, have high electrical conductivity and, by virtue of the dense matrix, have excellent resistance to chemical attack.

6 Claims, 1 Drawing Figure

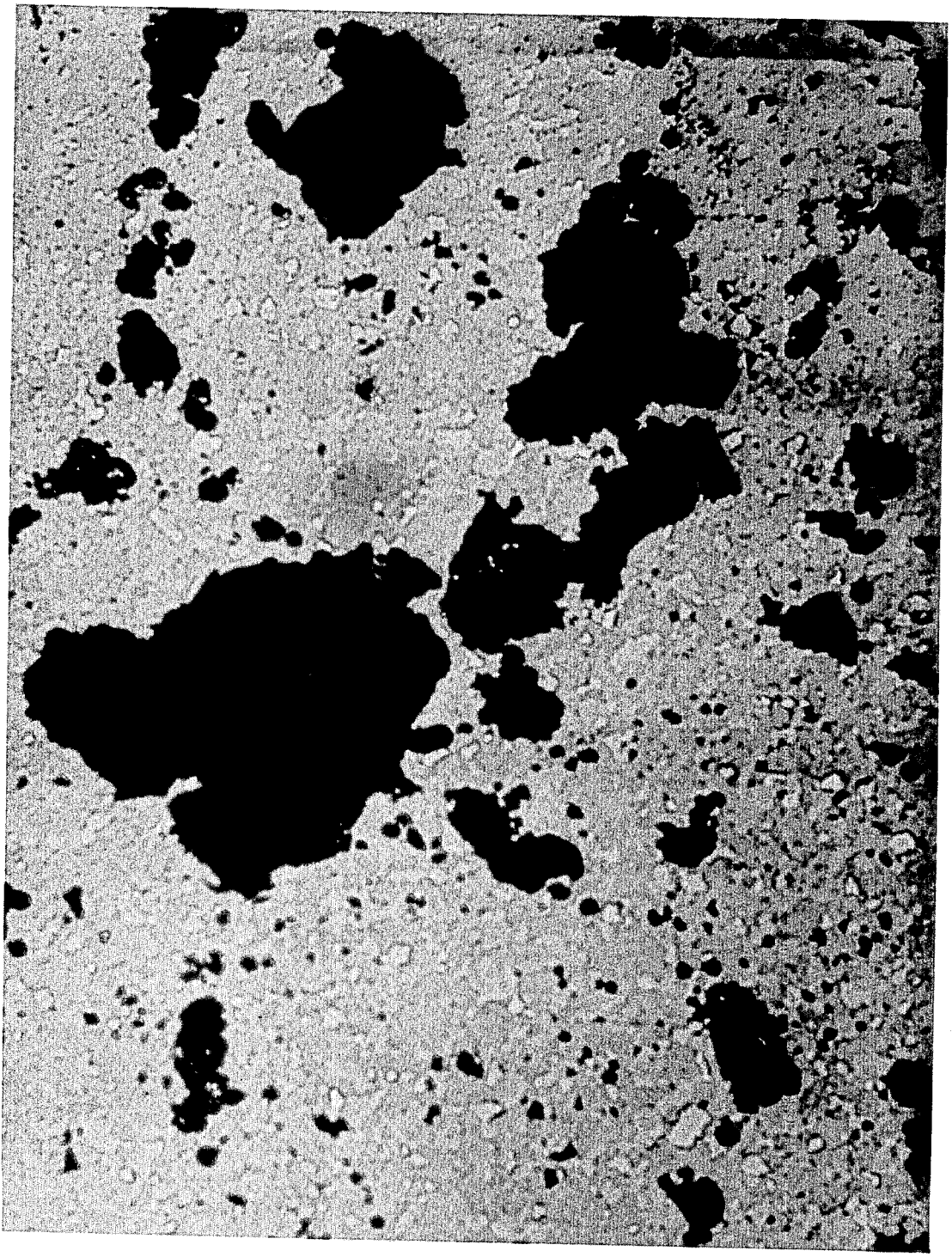

POROUS REFRACTORY METAL BORIDE ARTICLE HAVING DENSE MATRIX

BACKGROUND OF THE INVENTION

Refractory metal boride articles, for example, titanium diboride articles, have been proposed for use as cathodes in electrolytic aluminum reduction cells where the resistance of titanium diboride to chemical attack at very high temperatures in the corrosive environment, in addition to its high electrical conductivity, is very important. However, titanium diboride articles of moderate density, for example, 70–85 percent theoretical density, have been found to break down too quickly in the hostile environment of the aluminum cell to be of practical utility. The porosity of such articles occurs primarily at grain boundaries and thus represents imperfect bonding of one grain to another. It is believed that electrolyte in the aluminum cells is capable of penetrating between the poorly bonded grains along the boundaries, thereby eventually breaking down the structure of the refractory article. Titanium diboride articles of near theoretical density, e.g., 95–99 percent theoretical, are expected to have a significantly longer life time in aluminum reduction cells than less dense articles because the grains are better bonded and the boundaries are more resistant to penetration by electrolyte.

Copending U.S. Pat. application Ser. No. 546,835 filed Feb. 3, 1975, discloses that submicron Group IVb metal diboride powders, i.e., titanium, zirconium, and hafnium diboride powders, prepared as described therein, containing carbon or refractory metal carbide may be cold pressed and sintered to near theoretical density, i.e., at least 95 percent of theoretical. Such cold pressed and sintered articles have the dense matrix that is expected to be more resistant to corrosion and infiltration in very hostile environments such as that of an aluminum reduction cell. The disclosure of said application has been published as part of German Offenlegungsschrift 25 23 423.

Refractory Group IVb metal diboride, e.g., titanium diboride, articles of less than theoretical density which possess advantages manifested by articles of near theoretical density offer the further advantages of lower cost and lighter weight. However, articles of reduced overall density which have the greater part of their porosity at grain boundaries are subject to attack at such boundaries by an electrolyte such as is present in an aluminum reduction cell, and the life of the article consequently is shortened.

SUMMARY OF THE INVENTION

In accordance with this invention, there is provided a refractory Group IVb metal diboride article having an overall density of between about 50 and 90 percent of the theoretical density of the metal diboride, a matrix of near theoretical density, i.e., at least 90 percent of theoretical density. The matrix is composed of small well-bonded, contiguous grains of about 1 to 20 microns in size, the greater proportion of which are between about 1 and 10 microns in size. Distributed throughout the matrix are pores which are relatively large compared with the grains, ranging in size from about 4 to 1000 microns or larger, the greater volume proportion of which are at least about 10 microns in size. The article may be produced by cold pressing a mixture of submicron metal diboride powder (containing carbon densifying aid) and solid hydrocarbon powder and then sintering the resulting cold pressed piece. Because the metal diboride powder contains a carbon densifying aid, i.e., carbon or a carbide, it is capable of forming a matrix of near theoretical density when cold pressed and sintered. The particles of the hydrocarbon powder remain distributed throughout the green piece when the mixture of diboride and hydrocarbon powders is cold pressed, and then when the piece is heated to sintering temperatures, the hydrocarbon is driven out leaving voids around which the metal diboride sinters to near theoretical density. The sintered article thus has a matrix of near theoretical density in which distinct voids formerly occupied by the hydrocarbon particles are distributed.

BRIEF DESCRIPTION OF THE DRAWING

The FIGURE is a photomicrograph of a cut, polished, unetched section of a titanium diboride article of this invention having an overall density of 85 percent and a matrix density of at least about 95 percent.

DETAILED DESCRIPTION OF THE INVENTION

When Group IVb metal diboride powders are cold pressed and sintered some porosity invaribly results; for example, between 0.5 and 30 percent by volume of the sintered article may be pore volume. Much of this porosity occurs at intergranular boundaries and represents incomplete or imperfect bonding of adjacent grains. Additional porosity occurs as pores occluded within individual grains. Articles having less porosity are composed of grains which are more stongly bonded to one another, and therefore have higher strength and are more impervious to chemical attack. Such intergranular boundary porosity can be lowered in a number of ways. For example, the use of powders having small particle sizes, for example submicron particle sizes, the careful control of particle size distribution, the use of pure powder, and the use of a densifying aid such as carbon or a metal carbide, all contribute to the formation of articles having tightly bonded grains with a low proportion of porosity at grain boundaries.

For some applications, for example, electrode applications, the properties of high electrical conductivity and high resistance to chemical attack are more important than very high mechanical strength. A sintered article of lower overall density and therefore lower mechanical strength but having high electrical conductivity and a matrix of near theoretical density would be of lower cost and lighter weight but would retain the properties most desirable for such applications. Refractory metal diboride articles of this invention have an overall density of between 50 and 90, e.g., 60 and 85, percent of the theoretical density of the metal diboride and contain less than about 5 percent, often less than about 1 percent, of intergranular boundary and intragranular occluded porosity. The pores of boundary and occluded porosity are generally very small, that is, less than about 1 micron in nominal sectional diameter. In addition to the boundary and occluded porosity, between about 5 and 50 percent, for example between about 10 and 44 or 10 and 25 percent, of the volume of the article is occupied by pores of substantial size, that is, pores greater than about 4 microns in nominal sectional diameter, for example, between about 4 and 1000 microns. The nominal sectional diameter is determined by microscopic examination of a cut and polished section of the article. Typically, these pores are between about 10 and 500 microns, for example, between about 25 and 250 microns. They can be of uniform size or of varied sizes as desired.

The pores of substantial size are in a sintered metal diboride matrix of near theoretical density, that is, a matrix of at least about 90 percent, more often at least about 95 percent, of theoretical density. The density of the matrix can be as high as 99 percent of theoretical, or even higher. The difference between the actual matrix density and the theoretical density is caused by the presence as part of the matrix of the above mentioned intergranular boundary and intragranular occluded porosity, which is normally present in sintered articles of less than theoretical density.

The apparent grain size, i.e., the average diameter, of the refractory metal boride grain in the matrix as measured on an etched metallographically polished surface of a sintered refractory metal boride specimen is predominantly fine. As measured on photomicrographs of the polished surface, substantially all, i.e., at least 90 percent, of the boride grains are less than 20 microns, and predominantly, i.e., at least 50 percent, in the range of about 1 to 10 microns, in size. The grains are of relatively uniform size and occur in a microstructure characterized by predominantly contiguous grain boundaries and low porosity resulting in high density and strength of the sintered matrix. By "predominantly contiguous grain boundaries" it is meant herein that a preponderant number of grains, i.e., at least 50 percent, e.g., 75 percent, or 90 percent, or higher, appear to be in contact with other grains at all points around their periphery when a photomicrograph of a polished, unetched section of the article at a magnification of 500 diameters is examined. Also present in the matrix, typically as separate phase inclusions smaller than about 1 micron, are impurities such as nitrogen and oxygen or metal compounds thereof and also any densifying aid such as carbon or a metal carbide.

A convenient method of making the porous refractory Group IVb metal diboride articles of this invention comprises mixing a Group IVb metal diboride powder capable of giving an article of near theoretical density when cold pressed and sintered with a hydrocarbon powder and thereafter cold pressed and sintered. When the mixture of powders is cold pressed, the particles of the hydrocarbon powder occupy spaces within the cold pressed compact. Then when the compact is initially heated in the beginning of the sintering cycle, the hydrocarbon is driven out either by volatilization or decomposition thereby leaving voids in the pressed piece which are of sufficient size so that the grains of metal diboride which grow during sintering do not close the pores. Rather, the pores remain open and the grains grow together around the pores. Thus, the pores are not imperfections at grain boundaries but rather represent areas where grain boundaries were prevented from forming. As a result, an article is formed having a dense matrix with little porosity at grain boundaries but containing relatively large voids formerly occupied by the hydrocarbon particles. Because there is relatively little boundary porosity in the article, wherever the grains are bonded they are well bonded and thus the boundaries are resistant to chemical penetration.

Group IVb metal diboride powders useful in the practice of this invention are those which may be cold pressed and sintered to near theoretical density, for example, to between about 95–99 percent theoretical density. The particles of such powders are submicron in size. Substantially all of the particles, that is, at least 90 percent of the particles, are smaller than about 1 micron in size. The particles are distributed in size between about 0.05 microns and 1 micron with the preponderant number of the particles, that is, at least 50 percent of the particles, being between about 0.05 and 0.7 microns. The metals of Group IVb of the Periodic Table of the Elements are titanium, zirconium, and hafnium. Particles as small as 0.03 microns and as large as 2 microns may be present in the powder but particles greater than 2 microns rarely represent more than 1 percent by number of the particles. The number median size of the particles is usually between about 0.09 and 0.6 microns, more usually between about 0.1 and 0.5 microns, and varies directly with the surface area of the powder. The surface area may vary between about 3 and 35 square meters per gram ($m^2/g$), more typically between about 4 and 15 $m^2/g$, e.g., between 5 and 10 $m^2/g$, as measured by the nitrogen adsorption method of Brunauer, Emmett, and Teller, *Journal of the American Chemical Society*, 60, 309 (1938).

The refractory metal diboride powders described herein contain in addition to the submicron metal diboride itself a sintering or densifying aid such as finely divided carbon or a metal carbide which promotes sintering to near theoretical density, at least 95 or even 99 percent of the theoretical density of metal boride. Useful metal carbides include hafnium carbide, titanium carbide, tantalum carbide, zirconium carbide, boron carbide, silicon carbide, etc. The carbides of the refractory metals of Groups IVb, Vb, and VIb of the Periodic Table of the Elements are contemplated. The carbon may be present in the sintered article as elemental carbon or as chemically combined carbon or as mixtures thereof. The carbon may be introduced by physically blending submicron titanium, zirconium, or hafnium diboride with finely divided carbon or with one of the above mentioned finely divided carbides, notably as submicron particles. Preferably the carbon or carbide is coproduced with the submicron metal diboride powder, for example, by the process described by Offenlegungsschrift 25 23 423. In that process, carbon-containing submicron Group IVb metal diboride powder is produced by a reaction of a metal source reactant such as titanium tetrachloride and a boron source reactant such as boron trichloride in an arc-heated hydrogen stream to which a carbon source reactant such as a hydrocarbon halogenated hydrocarbon, e.g., ethane, toluene, acetylene, ethylene dibromide, methyl chloroform, and 1,1,2-trichloroethane, is also added. The resulting submicron product contains submicron carbon or the corresponding metal carbide intimately dispersed therein. It is disclosed in said Offenlegungsschrift that the total carbon content of the metal diboride powder calculated on an uncombined basis is a minor amount up to about 10 percent, e.g., from above 0.1 to about 5 percent by weight of metal diboride. The weight of carbon is calculated as elemental carbon whether it is present partly or wholly as submicron metal carbide. The various Groups of the Periodic Table of the Elements herein mentioned in the specification and the claims are those set forth in the Periodic Table on the back cover of the *Handbook of Chemistry and Physics*, 45th Ed. (Cleveland: The Chemical Rubber Co., 1964), which is incorporated herein by reference.

The contemplated powders may be produced by using the above described reactants or the corresponding zirconium or hafnium compounds in the process described in U.S. Pat. No. 3,979,500, the disclosure of which insofar as it relates to the preparation of titanium, zirconium, and hafnium borides is incorporated herein by reference. Briefly, the borides are made by reaction in the vapor phase of the corresponding vaporous metal halide, for example, the chloride, with the source of boron, for example, boron trichloride, at high temperature, for example in an arc-heated stream of hydrogen. The FIGURE of U.S. Pat. No. 3,661,523, also incorporated herein by reference, illustrates an apparatus suitable for the preparation of these submicron boride powders. The entire disclosure of German Offenlegungsschrift 25 23 423, which describes the preparation of useful carbon-containing submicron metal diboride powders in great detail, is incorporated herein by reference.

Articles may also be prepared in accordance with this invention from mixtures of the above described metal diboride powders in any desired proportion. Furthermore, any Group IVb metal carbide or mixtures of carbides may be used as a sintering aid in conjunction with any Group IVb metal diboride or mixture thereof. Thus, for example, zirconium carbide may be used to aid in the sintering of titanium diboride, and a mixture of titanium and hafnium carbides may be used to aid in the sintering of a mixture of titanium and zirconium diborides. Thus, metal diboride powders treated in acordance with this invention may be made up of a single metal diboride, for example, titanium diboride, or may be a mixture of two or more of the specified metal diborides in any proportion. Besides the metal diborides, the powder may include a carbon sintering aid as described above.

As the term is used herein in the specification and the claims "submicron Group IVb metal diboride powder" is meant to include submicron diborides of titanium, zirconium, and hafnium and mixtures of such diborides which also contain a minor proportion, e.g., up to about 5 percent by weight of metal diboride, of a sintering aid, such as carbon. Such carbon may be present either as elemental carbon or as metal carbide or as mixtures thereof.

Preferably, the metal diboride powders used in this invention are coated with a small amount, for example, between about 0.5 and 5 weight percent, of a lubricant and binder such as a soft paraffin wax, which serves to give more uniform compaction of the powder and to provide greater strength in the cold pressed piece. The binder is uniformly distributed on the metal boride powder by application either from solution or, preferably in the molten state in the absence of solvent. Preferably the wax coated powder is granulated to a convenient size, e.g., between about 20 and 100 Tyler mesh, for ease in handling and in filling the molds. The bulk density of the wax-coated powder is preferably such that its compression ratio upon cold pressing is between about 2:1 and 3.5:1, that is, the volume of the unpressed powder in a mold is between about 2 and 3.5 times the volume of powders having the described compression ratios of the pressed piece.

The metal diboride powders used in the present invention are very sensitive to oxygen and moisture, reacting spontaneously upon contact with air at room temperatures to form undesirable metal oxides, and so are kept under inert conditions, that is, either in an inert atmosphere or in a vacuum, during the preparation of the articles of this invention. As an inert atmosphere, a non-reactive gas such as nitrogen or, preeferably, an inert gas such as helium, neon, argon, krypton, or xenon, may be used.

It is believed that the avoidance of oxygen contamination of the powder is important in achieving a cold pressed sintered article having high resistance to attack by the electrolyte present in an aluminum reduction cell during its operation. Thus, powders prepared as described herein by reference or otherwise may have very high purity, for example, 99 percent purity or higher, depending upon the purity of the reactants employed in making the powder. Care should be taken to preserve the purity as far as possible. Thus, in the coating of the powder with a binder wax it is preferable to apply the wax without the use of solvent, because solvent addition and removal may introduce oxygen or oxygen-containing contaminants into the powder. Also, a binder which is substantially uncontaminated by oxygen or other undesirable contaminants is used. Useful binders include paraffin waxes having melting points between about 90° and 180° F. The paraffins are hydrocarbons, that is, they are composed only of hydrogen and carbon, and are rapidly available in high purity, having in particular very low oxygen and moisture content.

The particulate hydrocarbons used in the practice of this invention are distinguished from the binder waxes described above in that the particles remain discrete when mixed with the metal diboride powder; that is, they are not coated uniformly onto the metal diboride powder but are merely mixed with the powder. The purpose of the binder wax is to lubricate the powders during compaction and to hold them together in the cold pressed piece giving it added strength for handling. The binder disappears substantially completely during sintering so that adjacent metal diboride particles can fuse together in the process of grain growth. On the contrary, the purpose of the particulate hydrocarbon is to occupy space within the cold pressed piece, separating the metal diboride particles and creating voids across which metal diboride particles cannot fuse together upon sintering. The same considerations of purity apply to these particulate hydrocarbons which applied to the binder waxes described above. In addition to purity, the two characteristics most important in the selection of a useful particulate hydrocarbon are hardness and particle size. The particulate hydrocarbon must be hard enough so that when the powders are compacted at pressures of from about 0.5 to 50 tons per square inch, the hydrocarbon will remain in particulate form. Thus, the useful particulate hydrocarbons are sufficiently hard to retain their particulate form under the pressure of cold pressing and do not flow between the articles of metal boride powder as very soft waxes might be expected to do. In practice, any hydrocarbon that can be maintained in discrete particulate form without excessive agglomeration at cold pressing temperatures, e.g., room temperature or slightly above, before and during the mixing of the powders will also remain particulate in green pressed at as much as 50 tons per square inch or more. In addition, the hydrocarbon must be capable of being finely divided and of remaining finely divided, either as individual particles or as small agglomerates, during handling and mixing operations, rather than forming excessively large agglomerates. Useful hydrocarbons include paraffin waxes having a melting point above about 125°F., preferably above about 150°F., and microcrystalline petroleum waxes. Additionally, hydrocarbon polymers such as finely divided polyethylene, polypropylene, polystyrene, or poly(ethylene propylene diene) may be used. Any particulate hydrocarbon substantially free of undesirable contaminants, such as oxygen and moisture, and which will volatilize or decompose upon heating of the pressed piece below sintering temperatures may be used. Thus hydrocarbons which will volatilize or decompose below sintering temperatures of the metal diboride powder being used, for example, at temperatures between about 200° and 400° C. or higher, are useful.

The particle size of a useful particulate hydrocarbon such as microcrystalline petroleum wax is such that upon volatilizing or decomposing it leaves a void in the green pressed piece which is large enough to remain open during sintering. The particles, which may be individual particles or small agglomerates, should be small enough to avoid the formation of large voids, for example, voids greater than 1 millimeter in diameter in the sintered piece, because large voids will unduly weaken the structure mechanically. The average particle size of the hydrocarbon is substantially larger than the average particle size of the metal diboride powder, although a minor proportion, e.g, about 10 weight percent, of very small, e.g., submicron, hydrocarbon particles may be present. Thus where submicron metal diboride powder is used, particulate hydrocarbons having particles of at least about 5, preferably at least about 50 microns, in nominal sectional diameter is used. Ordinarily, hydrocarbon powder having particles in the range of 10 to 500 microns, e.g., 25 to 250 microns, may be used. The particles of hydrocarbon may be of substantially uniform size or of varied sizes within the disclosed ranges. The voids left in the green piece when the hydrocarbon particles volatilize or decompose upon heating may be expected to close up slightly when the green piece is sintered, because the green piece shrinks upon sintering. Therefore, the pore size of the finished article, will be somewhat smaller than the hydrocarbon particles, for example about 16 percent smaller in diameter.

The proportions of metal diboride powder and hydrocarbon powder mixed together depend upon the bulk density of the metal diboride powder and of the hydrocarbon powder, the particle size of the hydrocarbon, and the nature of the hydrocarbon. Sufficient hydrocarbon powder is used to provide sintered articles having the desired density, typically in the range of 50-90 percent of theoretical density. Typically, between about 1 and 25 percent hydrocarbon by weight of metal diboride powder may be used; more usually between about 2 and 15 percent, for example, 3 to 10 percent, may be used. The exact proportions of a particular metal diboride powder and a particular hydrocarbon powder to use to obtain a sintered article of the desired overall density are best determined by experiment in each case.

The metal diboride powder and the hydrocarbon powder are blended uniformly, for example by tumbling, shaking, sifting, etc., to assure thorough mixing of the powders and the absence of excessively large agglomerates of the hydrocarbon. Sifting, in particular, will serve to reduce the size of agglomerates of non-sticky waxes such as microcrystalline petroleum waxes. The blending, of cource, is done at a temperature such that the hydrocarbon remains solid and preferably non-sticky to reduce the tendency towards agglomeration of the hydrocarbon. Owing to the sensitivity of the metal diboride powders to oxygen, moisture, and air, the blending with the hydrocarbon powder is preferably done under an inert atmosphere, such as argon or neon.

The well mixed diboride and hydrocarbon powders are then placed into a conventional mold for cold pressing. For example, the mold may be a steel cavity mold or die of the type used for pressing in a hydraulic ram press, or it may be a rubber bag mold of the type used for isostatic pressing. In filling the mold, care is taken to avoid uneven compaction or air spaces, but settling techniques such as vibrating the mold which might tend to cause the metal diboride and hydrocarbon powders to separate or segregate should be avoided. If the metal diboride powder is wax coated and granulated before being mixed with the hydrocarbon powder, then slight tapping of the mold as it is filled should be sufficient to assure uniform filling.

The filled mold is pressed in a conventional manner at room temperature or slightly above. Pressures of between about 0.5 and 50 tons per square inch are commonly used, e.g., 5-25 tons per square inch. The pressure used is high enough to compact the powders to form a green piece having enough physical strength to be handled and removed from the mold, but not so great as to cause the hydrocarbon to flow and lose its particulate form. In order to determine whether the hydrocarbon has remained in particulate form the green piece may be cut open and inspected by microscope. If the particles have flowed excessively so that an insufficient or too small of a void may be left when the particulate hydrocarbon is driven out upon heating then a harder hydrocarbon or a lower cold pressing pressure may be used.

After cold pressing, which is done at room temperature or slightly above, the green piece has particles of hydrocarbon distributed throughout. After the green piece is removed from its mold it is transferred to a conventional sintering furnace where it is heated to sintering temperatures of between about 1800°–2500° C. The green piece is first heated at temperatures below sintering temperatures sufficient to volatilize or decompose the particulate hydrocarbons in the green piece. Ordinarily a sintering furnace will take several hours, for example, 6 hours to go from approximately room temperature to sintering temperatures on the order of 1880° C. and above, depending in part upon the mass of the articles in the furnace. During the warm-up period, particulate hydrocarbons will be driven out, so that no separate step will be required. However, if desired, the green piece may be heated at a temperature below sintering temperatures, for example, 200°–500° C. for between about 30 minutes and 2 hours, e.g., 1 hour, in order to drive out the hydrocarbon. Then when sintering temperatures are reached, preferably temperatures between about 1880° and 2200° C, the submicron particles of metal diboride begin to sinter, that is, to grow into one another to form larger grains which become tightly bonded to one another, forming a matrix of near theoretical density surrounding the voids formerly occupied by the particulate hydrocarbon. The furnace is held at sintering temperatures for at least 30 minutes, e.g., about 30 minutes to 2 hours. Normally, about 1 hour at 2100° C. produces an excellent result when the diboride is titanium diboride.

The overall density of the refractory article reflects both the boundary and occluded porosity and the larger, controlled porosity caused by inclusion of particulate hydrocarbon. The controlled porosity attributable to the inclusion of the hydrocarbon may be measured in two ways. First, a cross-section of the sintered refractory article may be examined by means of a microscope. The fraction of a unit cross-sectional area occupied by gross pores of at least 4.0 microns in nominal sectional diameter provides a measure of gross porosity of the article. The fraction of the overall volume of the article occupied by the gross pores may be determined by raising to the 1.5 power the fraction of the unit cross-sectional area occupied by the pores of at least 4.0 microns in nominal sectional diameter as determined by the microscopic inspection. Another approach to determining the porosity attributable to the inclusion of the hydrocarbon particles is by difference: two test pieces of the same size and shape are cold pressed and sintered under identical conditions, one made from the metal diboride powder alone and one made from a mixture of the metal diboride powder with hydrocarbon powder. The difference in the overall density of the two pieces which have been pressed and sintered under identical conditions is a measure of the gross porosity attributable to the inclusion of the hydrocarbon.

The matrix density of an article of this invention may be found from the overall density of the article as a fraction of the theoretical density and from the fractional volume of the article attributable to gross pores of at least 4.0 microns. The volume fraction of the article occupied by the matrix is determined by subtracting the volume fraction of gross porosity from 1.0. Then, the overall density, expressed as a fraction of the theoretical density, is divided by the fractional volume occupied by the matrix, and the result is converted to a percent. Thus, by definition herein, pores less than 4.0 microns in size are considered to be part of the matrix. For example, an article having an overall density of 0.85 and a volume fraction of gross porosity of 0.10 has a $(0.85 \div (1.00 - 0.10)) \times 100 = 94.4$ percent dense matrix.

The extent of continuity or discontinuity of the controlled porosity caused by inclusion of the hydrocarbon particles in the green piece depends on the powders used, on the proportions of metal diboride powder and hydrocarbon powder, and on the pore sizes and percent of gross porosty. If the controlled porosity is very low then the pores may be expected to be primarily discontinuous. That is, the pores will not be connected to one another. However, an article having an overall porosity of about 15 volume percent may have as much as 11 percent continous porosity or more. Continuous porosity may be measured by weighing an article of known volume, infiltrating the article with a liquid, such as water, with the use of a vacuum or heating, and reweighing the article to determine the amount of liquid absorbed. Articles having continuous porosity may also be infiltrated with molten aluminum and are expected to have improved resistance to thermal shock, such as the thermal shock experienced at the start-up of an aluminum reduction cell.

It is expected that the aluminum within the article will increase the thermal conductivity of the article, particularly at temperatures above the melting point of aluminum. Because the Group IVb metal diborides are readily wetted by aluminum, infiltration of a porous article of this invention is simple. For example, the article may be immersed in molten aluminum under reduced pressure or vacuum, and then when the pressure is increased, the aluminum will enter the pores of the article.

The following Example illustrates how the present invention may be practiced.

EXAMPLE

Submicron titanium diboride powder, having a surface area of 7.9 $m^2$/gram, a poured bulk density of 53.9 pounds per cubic foot and coated with 2 weight percent Gulfwax ® 20, a paraffin melting at about 120° F., was screened through a 14 Tyler mesh screen. The powder had been produced in accordance with the process described in Offenlegungsschrift 25 23 423 and had a total carbon content of 0.73 percent by weight of metal diboride.

Eight hundred grams of the wax-coated, screened powder was thoroughly mixed with 48 grams of XEQ Polymekon microcrystalline petroleum wax (Western Petro Chemical, Inc.), having agglomerates composed of spherical particles of about 5 microns in diameter. The mixture was stirred, shaken, and sifted three times through a kitchen flour sifter having a screen of about 14 mesh in order to reduce the size of the wax powder agglomerates.

About 830 grams of the mixed powders was placed in a rubber bag mold containing a central cylindrical mandrel and isostatically pressed at 18,500 pounds per square inch. The powder and the pressed piece were kept under an argon atmosphere at all times and protected from contact with air, oxygen, or moisture. The resulting green pressed tube was heated from room temperature to 2100° C. in an argon-flushed sintering furnace under vacuum (about 0.1 millimeters of mercury) over a period of about 7.5 hours, held for 1 hour at 2100° C., and allowed to cool from 2100° C. to 1000° C. over a period of 2 hours. The furnace was then filled with argon and allowed to cool further overnight. The sintered tube had an overall density of 84.8 percent of the theoretical density of titanium diboride.

The Fig. is a photomicrograph of a cut, polished unetched section of this tube shown at a magnification of 500 diameters. Visual inspection of the matrix (the light areas) and comparison with photomicrographs of sintered articles having an overall density of greater than 99 percent of theoretical showed that the matrix in the Figure has a density of about 96 to 98 percent and is composed of fine, well bonded grains predominantly between about 2 and 15 microns. The pores (dark areas) visible in the photomicrograph are predominantly in the range from about 5 to about 125 microns in diameter.

About 11 volume percent of the tube was continuous porosity, as measured by immersing the tube in boiling water until bubbles stopped flowing from the article and determining the amount of water absorbed.

By immersion of this article in molten aluminum, an article containing up to about 11 percent elemental aluminum could be prepared.

Similarly, articles of titanium, zirconium, and hafnium diborides and mixtures thereof having a range of overall densities and pore size may be obtained with the use of selected proportions of hydrocarbon powder of varying particle size.

While the invention has been described with reference to specific details of certain illustrative embodiments, it is not intended that it shall be limited thereby except insofar as such details appear in the accompanying claims.

We claim:

1. A cold pressed and sintered refractory Group IVb metal diboride article having an overall density of between about 50 and 90 percent of the theoretical density of the metal diboride and a matrix of at least 95 percent of the theoretical density, the matrix having a microstructure characterized by predominantly contiguous grain boundaries and a fine grain size, the article having between about 5 and 50 percent of its volume in pores of between 4 and 1000 microns in nominal sectional diameter.

2. The article of claim 1 wherein the pore volume is between 10 and 25 percent of pores of between 10 and 500 microns.

3. The article of claim 1, wherein between about 10 and 40 percent of the overall volume of the article is in pores of between 4 and 1000 microns.

4. The article of claim 1, wherein the overall density is between about 60 and 85 percent.

5. The article of claim 1, wherein at least about 50 percent of the grains are between about 1 and 10 microns in nominal sectional diameter.

6. The article of claim 1, wherein the metal diboride is titanium diboride.

* * * * *